(12) United States Patent
Chou

(10) Patent No.: US 7,016,284 B2
(45) Date of Patent: Mar. 21, 2006

(54) METHOD AND RELATED CIRCUIT FOR GENERATING A WOBBLE CLOCK AND AN ATIP CLOCK THROUGH A REFERENCE CLOCK AND A WOBBLE SIGNAL

(75) Inventor: Sue-Hong Chou, Taipei Hsien (TW)

(73) Assignee: VIA Optical Solution, Inc., Hsin-Tien (TW)

( * ) Notice: Subject to any disclaimer, the term of this patent is extended or adjusted under 35 U.S.C. 154(b) by 603 days.

(21) Appl. No.: 10/064,053

(22) Filed: Jun. 5, 2002

(65) Prior Publication Data

US 2003/0048120 A1    Mar. 13, 2003

(30) Foreign Application Priority Data

Sep. 12, 2001 (TW) .............................. 90122672 A

(51) Int. Cl.
*G11B 27/22* (2006.01)

(52) U.S. Cl. .................................. 369/53.34; 327/166
(58) Field of Classification Search ............. 369/53.44; 327/166; 250/201.5; G11B 27/22; H03K 5/01
See application file for complete search history.

(56) References Cited

U.S. PATENT DOCUMENTS 6,700,847 B1 * 3/2004 Osada ...................... 369/53.34
6,856,586 B1 * 2/2005 Usui et al. ............... 369/47.28

* cited by examiner

*Primary Examiner*—A M Psitos
(74) *Attorney, Agent, or Firm*—Winston Hsu

(57) ABSTRACT

A method and related circuit for clock generation and recovery utilizes digital components exclusively. The method is used to generate a wobble clock and an absolute time in pre-groove (ATIP) clock for controlling the operation of an optical disk drive. The circuit includes a counter and a digital logic circuit and utilizes clock triggering processes.

11 Claims, 13 Drawing Sheets

(Time)

METHOD AND RELATED CIRCUIT FOR GENERATING A WOBBLE CLOCK AND AN ATIP CLOCK THROUGH A REFERENCE CLOCK AND A WOBBLE SIGNAL

BACKGROUND OF INVENTION

1. Field of the Invention

The present invention relates to a method and related circuit for clock generation and recovery, and more particularly, to clock generation and recovery in an optical disk drive.

2. Description of the Prior Art

In this modern information based society, one of the major concerns is how to manage and store tremendous amounts of information. Compared to other kinds of storage media, the compact disk has a small size and a higher-density storage capacity. Due to developments in recordable and rewritable compact disk technology, consumers have the ability to utilize compact disk storage capacity on their personal computers.

In order to effectively manage the information stored on a compact disk, the data storage region of the compact disk is divided into many frames. Data can be stored in these frames according to a memory format. Each frame is identified by a minute/second, which means that a given frame corresponds to a particular time. The related time signal is known as the absolute time in pre-groove (ATIP).

A top view of a typical compact disk 10 is shown in FIG. 1. As is well known in the art, the compact disk 10 comprises a reflecting surface 13. A compact disk drive emits a laser beam onto the reflecting surface 13 of the compact disk 10, and the laser beam is reflected by different parts of the reflecting surface 13. The compact disk drive reads the information on the compact disk by collecting the reflected laser beam using an optical pickup.

On the reflecting surface 13 of the compact disk 10, there is a fine spiral track 11. Please refer to FIG. 1, which shows a magnified view 1A of the fine track 11. The track 11 is composed of two types of tracks, one being a data track 12 to record data, and the other being a wobble track 14 to record related time information of each frame. As illustrated in the magnified view 1A, the data track 12 has a continuously spiral shape, and the wobble track 14 has an oscillating shape. Additionally, the curvature of the wobble track 14 is composed of small segment curves with two different periods, D1 and D2.

In a further magnified view 1B in FIG. 1, an interrupt and discontinuity record mark 16 is shown within data track 12. The length of each record mark 16 varies, and the reflection characteristic of the record mark 16 is different from that of the reflecting surface 13. The record mark 16 is used to allow the compact disk drive to be able to write data onto the compact disk 10. The surface of the wobble track 14 protrudes beyond the reflecting surface 13. The data track 12 is located inside a groove formed by the raised wobble track 14 as is shown in FIG. 2, which is a three-dimensional perspective view of the magnified view 1B of the compact disk 10.

The process used to control the optical pick up in the compact disk drive to extract data from the wobble track 14 will now be explained using FIG. 3. As the compact disk rotates, an optical pick up 20 can be thought of as moving over the track 11 of the compact disk along the direction of arrow 18. In addition to a optical receiver (not shown) for reading the data from record mark 16 within the data track 12, there are four sensors within the optical pick up 20, namely Sa, Sb, Sc, and Sd. These four sensors are utilized to extract information from the wobble track 14. The positions of sensors Sa and Sd are controlled to be located within the groove of wobble track 14.The positions of sensors Sb and Sc are controlled to be located in the protruded area of the wobble track 14. The reflected laser beam intensities detected by the four sensors Sa, Sb, Sc, and Sd are different because of the difference in reflecting quality between the groove and the protruded area of the wobble track 14. As the optical pick up 20 moves along a straight path from the position shown to position P1, the sensing values of the four sensors Sa, Sb, Sc, and Sd change. A wobble signal can be generated by subtracting the electrical sensing value of Sa from that of Sd.

A waveform diagram of the wobble signal is shown in FIG. 4 with time along the abscissa and waveform amplitude along the ordinate. As described previously, the sensing values of the sensors Sa, Sb, Sc, and Sd change with time because the pick-up head 20 will detect different locations of the wobble track 14 when the compact disk 10 keeps rotating. This causes the wobble signal to change in amplitude with time. The curvature of the wobble track 14 is composed of two different curves with two different periods, D1 and D2. Consequently, the wobble signal waveform is also composed of two different curves with two different periods, T1 and T2, corresponding to the two periods, D1 and D2. Time information related to the control of the compact disk drive is stored by the changing period of the wobble track 14 and present in the wobble signal.

Waveform diagrams of the information associated with the wobble signal are shown in FIG. 5, which has time along the abscissa. FIG. 5 shows a wobble signal 22, an ATIP signal 24, a data clock signal 26, and a time data signal 28. After undergoing a waveform clipping process, the sinusoidal wobble signal in FIG. 4 is transformed into the square wave wobble signal 22. The integrity of the different periods, T1 and T2, is maintained in the new wobble signal 22. The portion of the wobble signal 22 with the period T1, and frequency 1/T1, corresponds to a high level signal in the ATIP signal 24. Likewise, portion of the wobble signal with the period T2, and frequency of 1/T2, corresponds to a low level signal in the ATIP signal 24. As a result, the time data corresponding to the record related area of the compact disk can be extracted from the wobble signal 22 using frequency demodulation.

The extraction of time data 28 is done using both the ATIP signal 24 and the data clock signal 26. As shown in FIG. 5, the data clock signal 26 is utilized to synchronize the reading of the ATIP signal 24.The ATIP signal 24 is read at each clock pulse in the clock signal 26 to generate the sequential bit sequence shown in the time data signal 28. A period TB of the data clock signal 26 defines the time duration of one bit in the ATIP signal 24. Through analysis of the time data 28, the information stored in the related records of the compact disk can be found and extracted. Also, when writing data to the compact disk, the data to be stored on the compact disk can be put into the correct record area.

The compact disk drive also utilizes a wobble clock to assist in the generation of the wobble signal. The wobble clock frequency is related to the average frequency of the changing frequencies, 1/T1 and 1/T2, in the wobble signal. The average frequency is close to $(1/T1+1/T2)/2$ with little deviation, and the frequency of wobble clock is normally twice as high as this average frequency.

A functional block diagram of a prior art data circuit 30 is shown in FIG. 6. The block diagram explains how a time data signal 50 and a wobble clock 48 are obtained from a wobble signal 32. Fundamentally, the prior art circuit 30 is very similar to a phase-locked loop (PLL). After the wobble signal 32 is determined, the wobble signal 32 is operated on by a pre-processing circuit 34, which is usually a frequency divider, and then fed to an input 36A of a phase comparator 36. The phase comparator 36 compares two input signals from two inputs, 36A and 36B, and outputs a corresponding signal to an output 36C according to the comparison result. The output 36C of the phase comparator 36 is connected to a low pass filter 40. The low pass filter 40 smoothes the signal from the phase comparator 36 and generates a control signal at node 38. As shown in FIG. 6, the control signal output at node 38 is provided to a wobble clock generator 46, a voltage controlled oscillator (VCO) 42, and a waveform shaping circuit 52. The wobble signal 32 contains two different frequencies, 1/T1 and 1/T2, and the control signal at node 38 reflects this. Specifically, the control signal changes with the changing frequency of the wobble signal 32, and forms a control waveform signal. The control waveform signal at node 38 is further processed by the waveform shaping circuit 52 and output as a time data signal 50. Similarly, the control waveform signal at node 38 is processed by the wobble clock generator 46 to create the wobble clock 48. In order for the circuit 30 to function like a PLL, the control voltage at node 38 is fed to a voltage controlled oscillator to generate a period signal. The period signal is further handled by a feedback processing circuit 44, which is functionally related to the pre-processing circuit 34, and then fed-back to the input 36B of the phase comparator 36 as a reference level for comparison. The reference level is utilized by the phase comparator 36 to distinguish between the different frequencies of the wobble signal 32.

The prior art circuit 30 has the major disadvantage of being designed using analog components. The charge pump in the phase comparator 36, the capacitors and resistors of the low pass filter 40 and the voltage controlled oscillator 42, are all analog components. Conversely, the data processing and signal controlling circuit modules in the compact disk drive are realized by programmable digital integrated circuits, such as digital signal processing chips. Combining analog and digital circuits is expensive and labor intensive.

SUMMARY OF INVENTION

It is therefore a primary objective of the claimed invention to provide a method and related circuit using cost-effective and laborsaving digital circuit design to solve the above-mentioned problem of the prior art analog circuit.

According to the claimed invention, the data circuit comprises a reference clock generator to generate a reference clock, a counter, a digital average processor to calculate an average number, a frequency divider to generate a wobble clock, a comparator to generate an absolute time in pre-groove(ATIP) signal, a waveform shaping processor to shape the ATIP signal into a time data signal, and a synchronizer to generate an ATIP clock.

According to the claimed invention, the method for recovering an ATIP clock and an ATIP signal from the wobble signal comprises counting the number of reference periods of a reference clock contained within a period of the wobble signal, and generating a corresponding counting result. The method further comprises, generating an average number according to the long-term average of the counting result, generating a wobble clock according to the average number and the counting result, and generating the ATIP clock according to the ATIP signal and the wobble clock.

It is an advantage of the claimed invention that the data circuit uses only digital components.

These and other objectives of the claimed invention will no doubt become obvious to those of ordinary skill in the art after reading the following detailed description of the preferred embodiment that is illustrated in the various figures and drawings.

DETAILED DESCRIPTION

Figure 7:
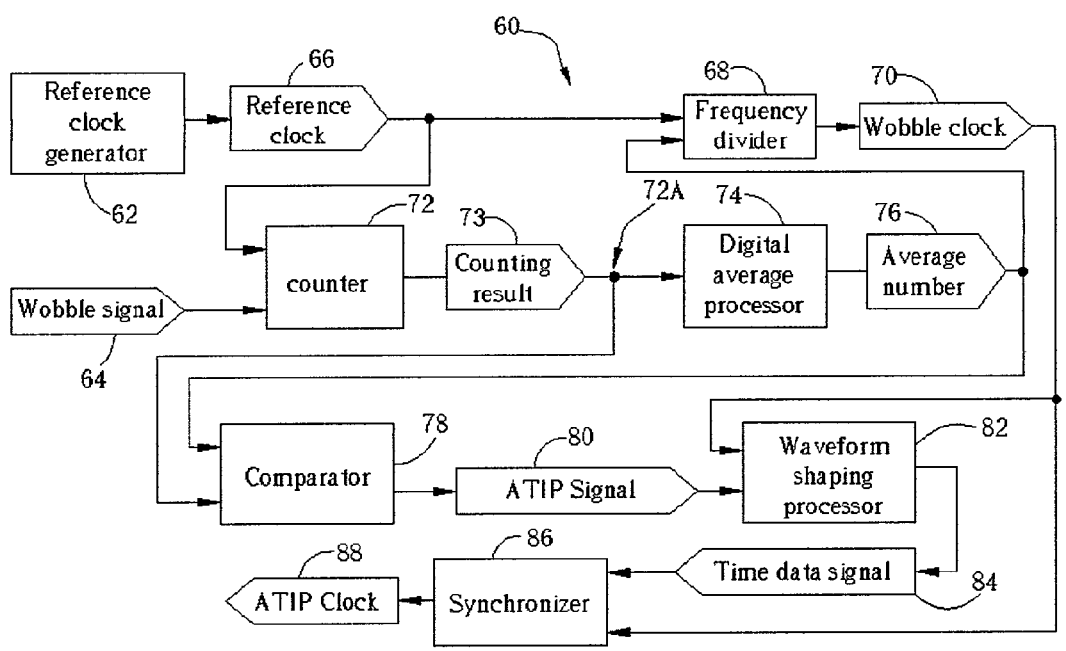
FIG. 7 is a functional block diagram of a data circuit according to the present invention.

The functional block diagram of a data circuit 60, in accordance with a preferred embodiment of the claimed invention, is shown in FIG. 7. The data circuit 60 comprises a reference clock generator 62 to generate a reference clock 66, a counter 72, a digital average processor 74 to calculate an average number 76, a frequency divider 68 to generate a wobble clock 70, a comparator 78 to generate an absolute time in pre-groove (ATIP) signal 80, a waveform shaping processor 82 to shape the ATIP signal 80 into a time data signal 84, and a synchronizer 86 to generate an ATIP clock 88.

Figure 1:
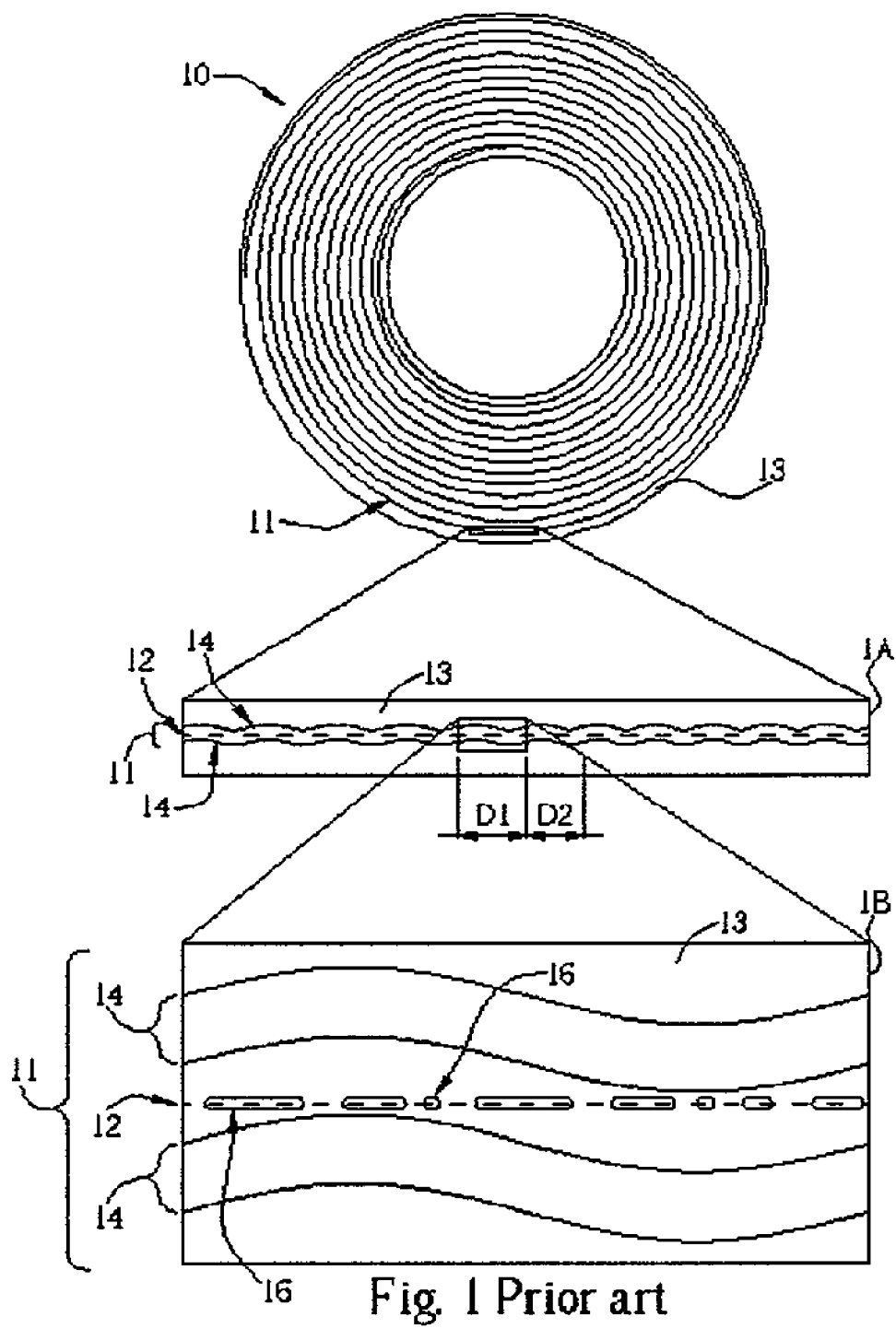
FIG. 1 is a top view of a compact disk according to the prior art.
Figure 2:
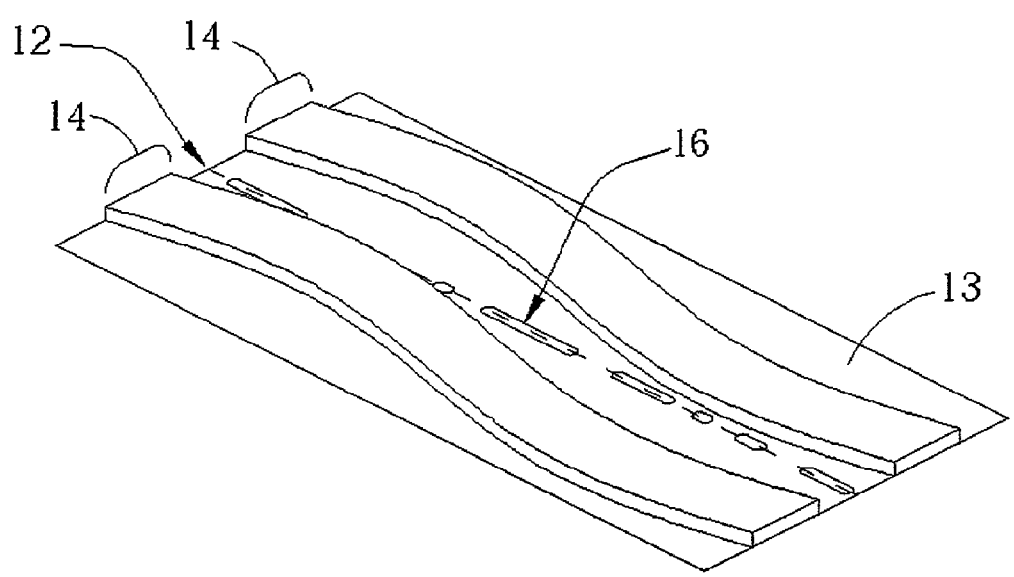
FIG. 2 is a perspective diagram of a portion of a reflecting surface of the compact disk shown in FIG. 1.
Figure 3:
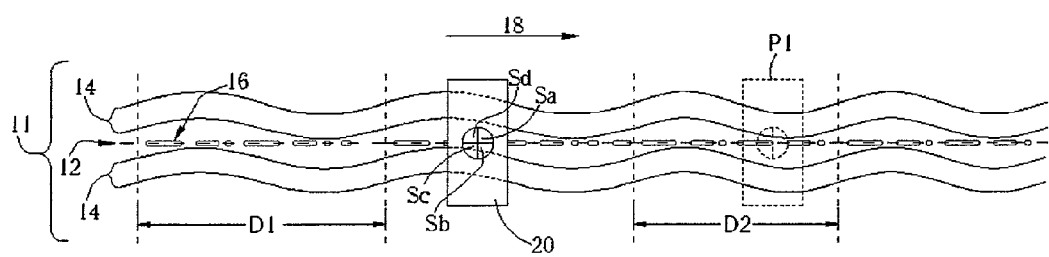
FIG. 3 is a schematic diagram showing a wobble tracking process of the compact disk shown in FIG. 1.
Figure 4:
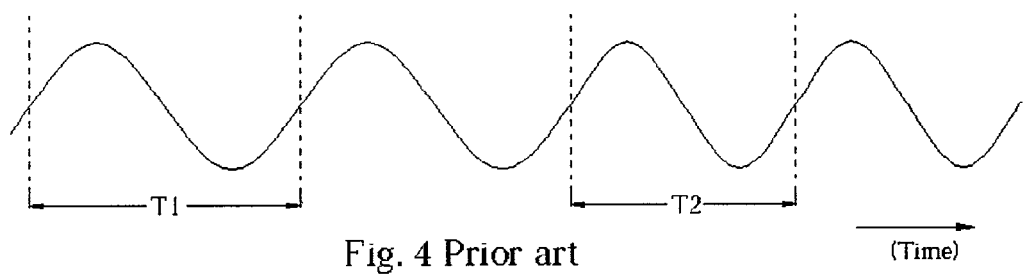
FIG. 4 is a waveform diagram of a wobble signal according to the prior art.
Figure 5:
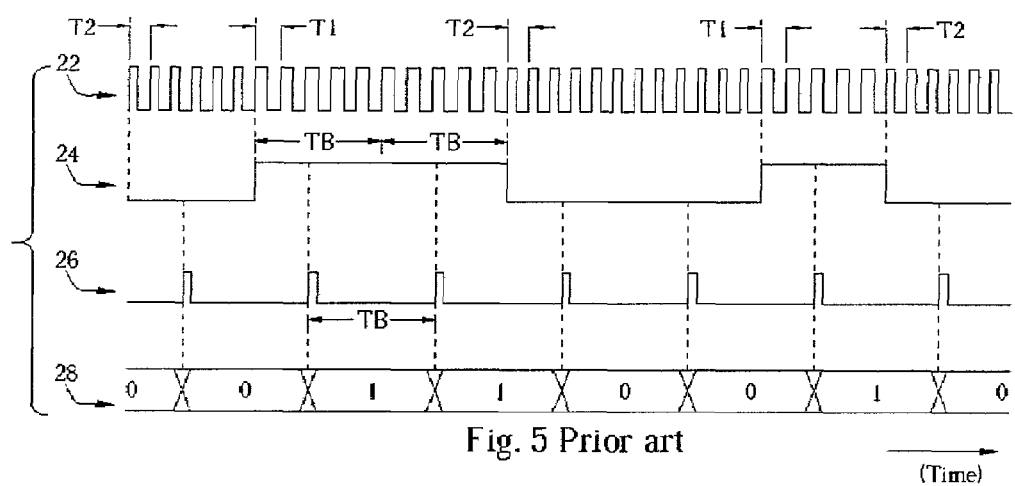
FIG. 5 is a diagram of waveforms of the wobble signal from FIG. 4, an ATIP signal, a data clock signal, and a time data signal according to the prior art.
Figure 6:
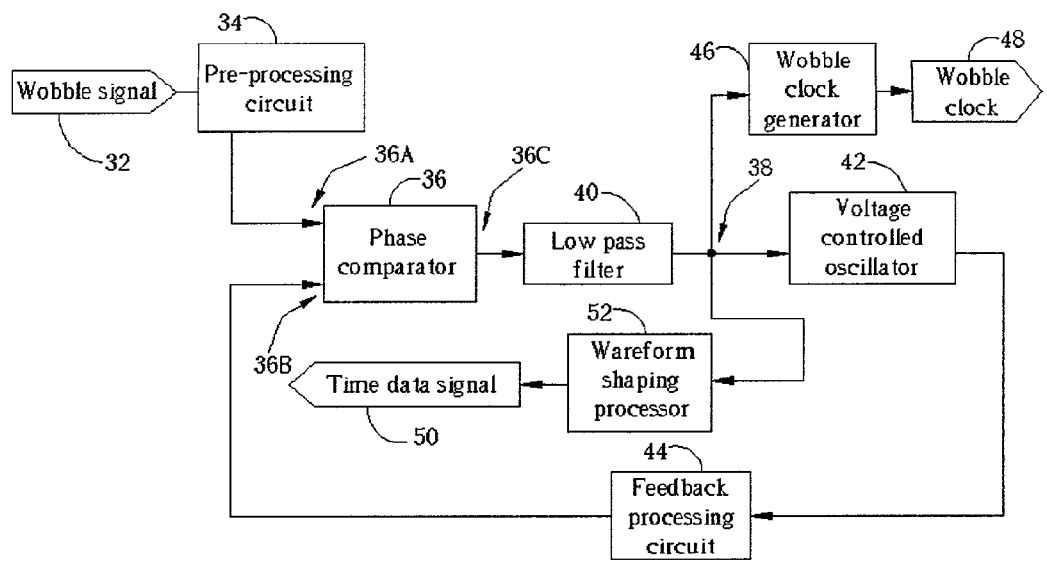
FIG. 6 is a functional block diagram of a prior art data circuit.

After extracting a wobble signal 64 from a compact disk, the wobble clock 70, the time data signal 84, and the corresponding ATIP clock 88 are generated by signal analysis of the wobble signal 64 by the data circuit 60. The sensors of an optical pick up in a compact disk drive are able to read a wobble track on a compact disk. The wobble signal 64, which is the same as a wobble signal 22 shown in FIG. 5, can be obtained from signal analysis of the sensing values. The main function of the data circuit 60 is to generate the wobble clock 70, a time data signal 84, and the ATIP clock 88 based on the wobble signal 64.

The function of the data circuit 60 according to the present invention will now be described in detail. The reference clock generator 62 generates the reference clock 66 with a fixed frequency. The reference clock 66 can be either an eight-to-fourteen modulation clock in the compact disk drive or a system clock in the data circuit 60. The frequency of the reference clock 66 is much higher than two different frequencies, 1/T1 and 1/T2, in the wobble signal 64. Since the frequency of the reference clock 66 is fixed, a reference period of the reference clock 66 is also fixed. Both the reference clock 66 and the wobble signal 64 are input to the counter 72, and the counter 72 counts the number of periods of the reference clock 66 occurring within a period of the wobble signal 64 to generate a corresponding counting result 73. Please refer to FIG. 8, which provides a clear picture of the counting process for the wobble signal 64. Both the waveforms of the wobble signal 64 and the counting result 73 at a node 72A are shown in FIG. 8.

Figure 8:
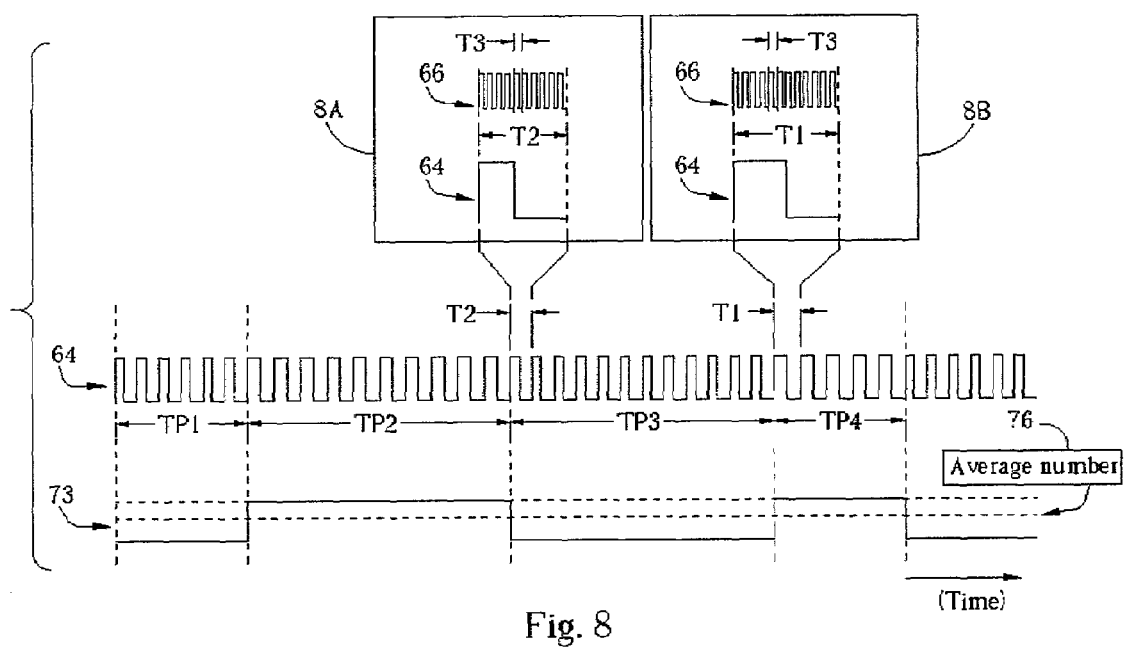
FIG. 8 is a diagram of waveforms of a wobble signal, and a counting result.

Referring to FIG. 8, the wobble signal 64 is composed of different segments with two different frequencies. Consequently, the wobble signal 64 comprises durations TP2 and TP4, which have a period T1, and the durations TP1 and TP3, which have a period T2. Taking advantage of the reference period T3 as a measuring unit, the counter 72 evaluates the number of reference periods T3 occurring within a single period of the wobble signal 64. A period T2 of the wobble signal 64 is shown magnified as 8A. In the same way, a period T1 of the wobble signal 64 is shown magnified as 8B. Since the frequency of the reference clock 66 is much higher than the frequencies 1/T1 and 1/T2, the reference period T3 is much smaller than the periods T1 and T2. Typically, the reference period T3 is about one hundred times shorter than the period T1 or T2. The counter 72 counts the number of reference periods T3 during a single period T1 or T2 and outputs the counting result 73 to the node 72A, in FIG. 7. Because the period T2 is shorter than the period T1, the number of reference periods 73 occurring in the period T2 is smaller than the number of reference periods 73 occurring in the period T1. The duration TP1 or TP3 of the wobble signal 64 with frequency 1/T2 is determined to have a low counting result 73. Conversely, the duration TP2 or TP4 of the wobble signal 64 with frequency 1/T1 is determined to have a high counting result 73. As is shown in FIG. 8, a waveform of the counting result 73 changes in signal level according to the different frequencies of different segments of the wobble signal 64.

The counting result 73 of counter 72 is provided to the digital average processor 74 to determine a long-term average number 76, which is also shown in FIG. 8. The frequency of wobble clock 70 corresponds to the average frequency of the wobble signal 64, and the frequency of wobble clock 70 is usually twice the average frequency of wobble signal 64. The average number 76 is a long-term average of the counting result 73 generated from the wobble signal 64. That is, the average number 76 is related to the wobble signal 64. Accordingly, the wobble clock 70 can be generated by a suitable frequency dividing process on the reference clock 66 by the frequency divider 68. Specifically, a wobble clock 70, with a frequency twice as high as the average frequency of the wobble signal 64, can be generated by controlling the dividing ratio of the frequency divider 68 to be a half of the average number 76. In other words, a wobble clock 70 is obtained by simply dividing the reference clock 66 by half of the average number 76. The wobble clock 70 is output by the data circuit 60 and used to control the rotating speed of compact disk in the compact disk drive.

The counting result 73 is also utilized to generate the time data signal 84. As mentioned, the waveform of the counting result 73 is similar to the waveform of the time data signal 84 and a simple method to transform the counting result 73 into the time data signal 84 will now be described. Both the average number 76 and the counting result 73 are input to the comparator 78. The comparator 78 outputs a high signal level when the counting result 73 is larger than the average number 76 and a low signal level when the counting result 73 is smaller than the average number 76. The comparison result between counting result 73 and average number 76 generated by comparator 78 is output to form the ATIP signal 80. Since the ATIP signal 80 may not be synchronized with wobble clock 70 and the waveform may not be shaped adequately, the ATIP signal 80 is fed to the waveform shaping processor 82. The waveform shaping processor 82 is able to generate a time data signal 84, which is synchronized with the wobble clock 70, with the aid of a triggering process.

Figure 9:
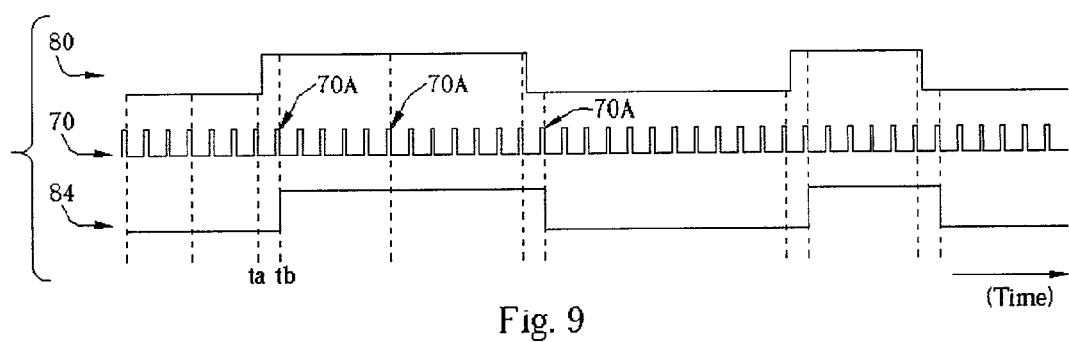
FIG. 9 is a diagram of waveforms of an ATIP signal, a wobble clock, and a time data signal.

The synchronizing process for the time data signal 84 is illustrated in FIG. 9, which shows waveforms of the ATIP signal 80, the wobble clock 70, and the time data signal 84. In FIG. 9, time is along the abscissa. The waveform shaping processor 82 samples the ATIP signal 80 at the falling edge 70A of the wobble clock waveform 70. For instance, the waveform shaping processor 82 samples a low level signal of the ATIP signal 80 at a time ta, and holds the low level signal for the time data signal 84 for the duration of the period of wobble clock 70. Likewise, the waveform shaping processor 82 samples a high level signal of the ATIP signal 80 at a time tb, and holds the high level signal for time data signal 84 for the duration of the period of wobble clock 70. Consequently, the rising edge of time data signal 84 is aligned with the falling edge of the wobble clock signal 70, and the time data signal 84 is thus synchronized with the wobble clock 70. In this way, the waveform shaping processor 82 synchronizes the ATIP signal 80 to form the time data signal 84.

Figure 10:
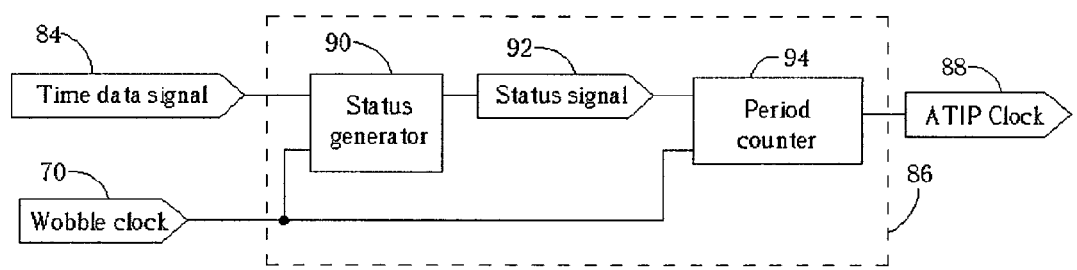
FIG. 10 is a functional block diagram of the synchronizer shown in FIG. 7.

After the time data signal 84 is formed, both the time data signal 84 and the wobble clock 70 are fed into the synchronizer 86 to generate the corresponding ATIP clock 88. The signal processing of the synchronizer 86 is illustrated in a functional block diagram FIG. 10. As shown in FIG. 10, the synchronizer 86 comprises a status generator 90 used to generate a status signal 92, and a period counter 94 used to generate the ATIP clock 88. Based on the signal level of time data signal 84 and the triggering of the wobble clock 70, the status generator 90 generates a status signal 92. Under the reset control of status signal 92 and the triggering of the wobble clock 70, the period counter 94 can accumulate a number of periods to generate the ATIP clock 88.

Figure 11:
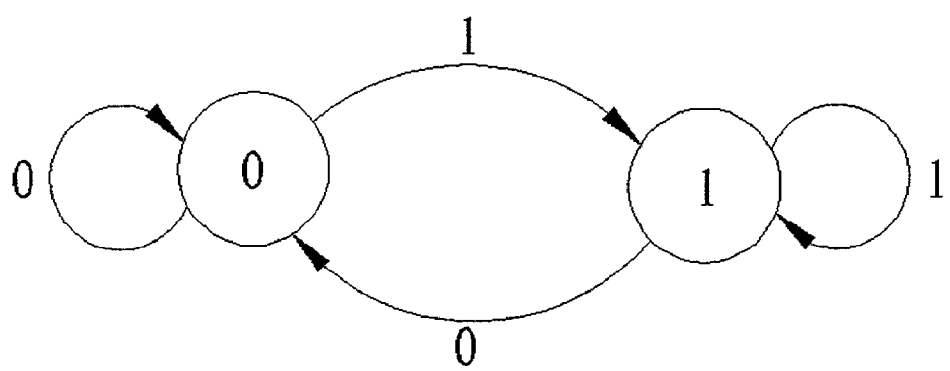
FIG. 11 is a state diagram of the status generator shown in FIG. 10.

For further explanation of the operation of synchronizer 86, please refer to FIG. 11, which is a state diagram of the status generator 90. In FIG. 11, state 1 represents a high level and state 0 represents a low level of the time data signal 84. When triggered by the rising edge of wobble clock signal 70, the status generator 90 detects the signal level of the time data signal 84. If the signal level of the time data signal 84 is low, corresponding to state 0, the status signal 92 generated by the status generator 90 becomes or remains in state 0. If the signal level of time data signal 84 then becomes high, the status signal 92 will switch to state 1. Additionally, if the signal level of time data signal 84 remains constant, the status signal 92 will be held in the corresponding state. Finally, if the signal level of time data signal 84 changes from high to low, the status signal 92 will switch from state 1 to state 0. The status generator 90 outputs the status signal 92 in this manner.

Figure 12:
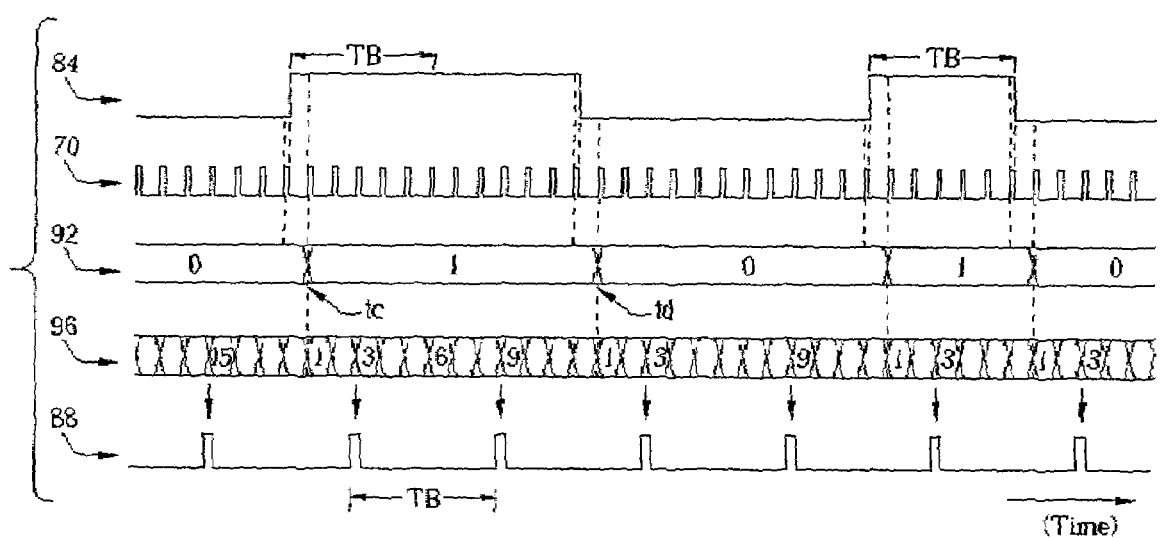
FIG. 12 is a diagram of waveforms of a wobble clock, an ATIP clock, and related signals.

Please refer to FIG. 12, having a time scale along the abscissa, for waveform diagrams of the time data signal 84, the wobble clock 70, the status signal 92, a number of periods 96 of the period counter 94, and the ATIP clock 88. As mentioned previously, the status generator 90 determines the signal level of status signal 92 using the time data signal 84 according to the triggering signal of the rising edge of the wobble clock 70. For instance, before a time tc, the signal level of the time data signal 84 is low, and the status signal 92 is accordingly maintained at state 0. However, at the time tc, the status generator 90 switches the status signal 92 from state 0 to state 1. After the time tc and until a time td, and since time data signal 84 remains at a high level, the status signal 92 is held in state 1. The period counter 94 resets the counted number of periods 96 when the status signal 92 changes. For instance, the period counter 94 resets the number of periods 96 at the times tc and td. The period counter 94 generates the ATIP clock 88 according to some rule using the number of periods 96 counted. For example, if a period TB of the ATIP clock 88 consists of six periods of the wobble clock 70, then the period counter 94 generates pulses of the ATIP clock 88 at the times when the value of number of periods 96 is 3, 9 (3+6), 15 (3+2*6), etc. The ATIP clock 88 is thus generated by the above extraction process performed on the data signal 84.

Figure 13:
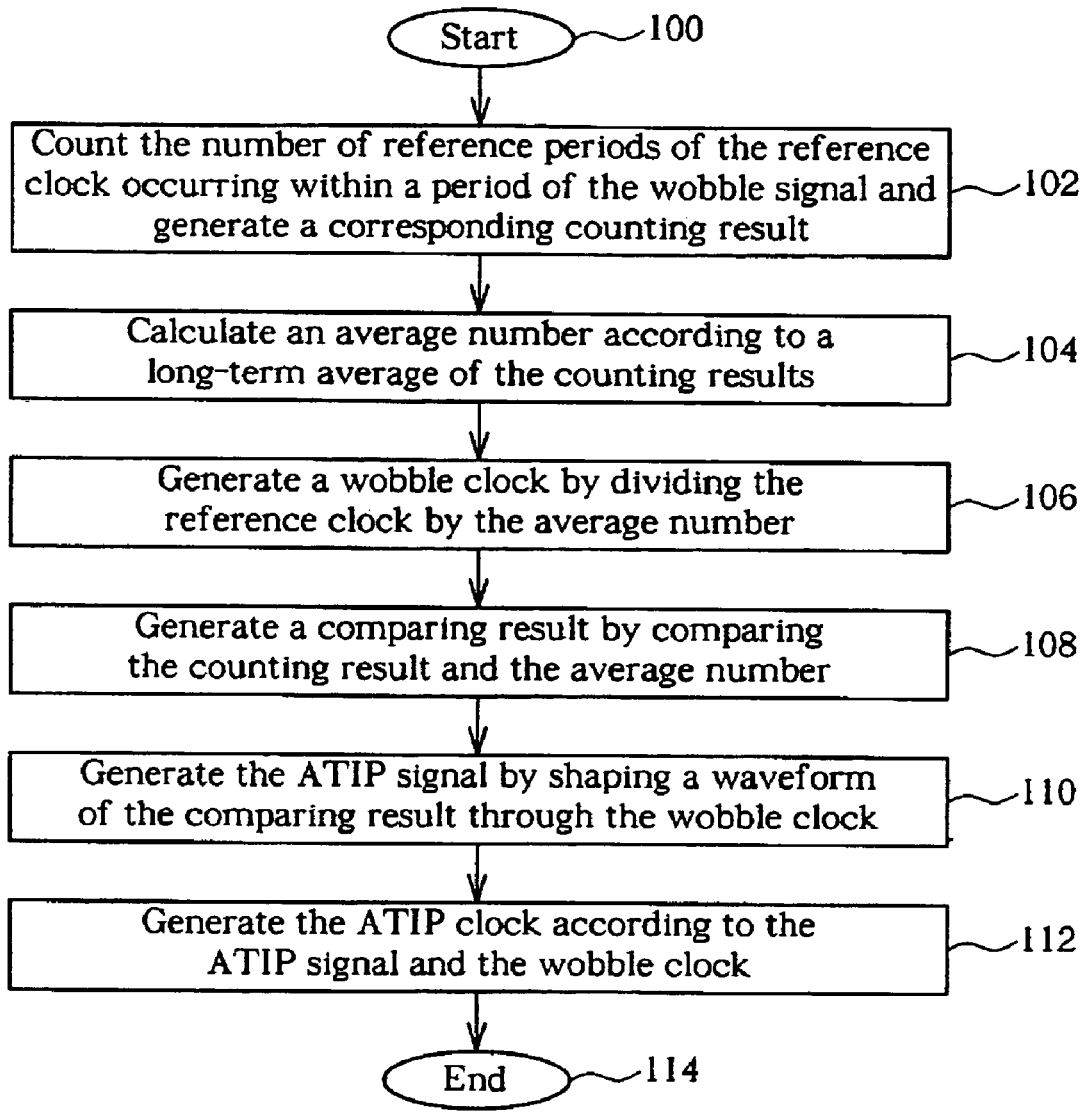
FIG. 13 is a flowchart summarizing the present invention clock generation method.

Please refer to FIG. 13. FIG. 13 is a flowchart summarizing the present invention clock generation method. Steps contained in the flowchart are described below.

Step 100: Start.

Step 102: Use the counter 72 to count the number of reference periods of the reference clock 66 occurring within a period of the wobble signal 64 and generate a corresponding counting result 73.

Step 104: Calculate an average number 76 according to a long-term average of the counting results 73.

Step 106: Generate a wobble clock 70 by dividing the reference clock 66 by the average number 76.

Step 108: Generate a comparing result with the comparator 78 by comparing the counting result 73 and the average number 76.

Step 110: Generate the ATIP signal 80 by shaping a waveform of the comparing result generated by the comparator 78 through the wobble clock 70.

Step 112: Generate the ATIP clock 88 according to the ATIP signal 80 and the wobble clock 70.

Step 114: End.

The present invention has been described referencing a preferred embodiment. The feature in which six periods of wobble clock 70 represent one pulse of the ATIP clock 88 is described in detail only for better understanding of the operation of the present invention. Generally, if the period of the ATIP clock 88 is to consist of N periods of the wobble clock 70, the period counter 94 will generate the pulses of the ATIP clock 88 at the times when the value of number of periods 96 is N/2, N/2+N, and N/2+2N etc. In the general case, the difference between two consecutive values of the counted number of periods 96 for generating the ATIP clock 88 is N. The number N is determined when the wobble clock 70 is generated by frequency divider 68.

Base on the above explanation of the present invention, the data circuit 60 of the present invention essentially comprises a counter and a logic processing circuit, which are designed using well known digital circuits and clock triggering processes, to generate the wobble clock 70, the time data signal 84, and the corresponding ATIP clock 88. Utilizing these signals, the compact disk drive is able to control the rotation speed of the compact disk, and thus able to extract all the record related information on the compact disk. In addition, the teachings of the present invention can be easily applied to different control modes of the compact disk drive, such as constant angular velocity (CAV) mode, and constant linear velocity (CLV) mode.

Compared to the prior art, which uses an analog phase-locked loop, the present invention is realized with a modern digital logic design. The present invention can therefore be easily integrated into the digital control modules of compact disk drives. All of the related manufacturing processes, from circuit design and simulation to production, can be based on the development processes of digital circuit modules. Thus, the labor saved in development and the costs reduced in production are the major advantages of the present invention.

Those skilled in the will readily observe that numerous modifications and alterations of the device may be made while retaining the teachings of the invention. Accordingly, the above disclosure should be construed as limited only by the metes and bounds of the appended claims.

What is claimed is:

1. A method for recovering an absolute time in pre-groove (ATIP) clock and an ATIP signal from a wobble signal through a reference clock, the ATIP clock being synchronized with the ATIP signal and the reference clock comprising a plurality of reference periods, each of the reference periods having a fixed interval, the method comprising:
   counting a number of reference periods of the reference clock occurring within a period of the wobble signal and generating a corresponding counting result;
   generating an average number according to a long-term average of the counting results;
   generating a wobble clock according to the average number and the reference clock;
   generating the ATIP signal by comparing the average number and the counting result; and
   generating the ATIP clock according to the ATIP signal and the wobble clock.

2. The method of claim 1 wherein the wobble clock is generated by dividing the reference clock by the average number.

3. The method of claim 1 wherein when generating the ATIP signal, a comparing result is first generated by comparing the counting result and the average number, and the ATIP signal is then generated by shaping a waveform of the comparing result through the wobble clock.

4. The method of claim 3 wherein the ATIP signal comprises a first signal and a second signal, a duration of the first signal corresponds to an interval of the wobble signal in which a number of reference periods is more than the average number, and a duration of the second signal corresponds to an interval of the wobble signal which has reference periods less than the average number.

5. The method of claim 4 wherein the ATIP clock is generated according to a synchronization between the ATIP signal and the wobble signal.

6. A circuit for generating a wobble clock through a reference clock and a wobble signal, the reference clock comprising a plurality of reference periods, each of the reference periods having a fixed interval, the circuit comprising:
   a counter for counting the wobble signal according to the reference clock;
   a digital average processor connected to the counter for averaging an output of the counter to generate an average number;
   a comparator for comparing the output of the counter with the average number so as to generate an ATIP signal; and
   a divider for dividing the reference clock by the average number so as to generate the wobble clock.

7. The circuit of claim 6 wherein the ATIP signal comprises a first signal and a second signal, a duration of the first signal corresponds to an interval of the wobble signal in which a number of reference periods is more than the average number, and a duration of the second signal corresponds to an interval of the wobble signal which has reference periods less than the average number.

8. The circuit of claim 6 further comprising a waveform shaping processor connected to the divider and the comparator for synchronizing the ATIP signal with the wobble signal.

9. The circuit of claim 6 further comprising a synchronization circuit for generating an ATIP clock synchronized with the ATIP signal through triggers of the wobble clock.

10. The circuit of claim 9 wherein the synchronization circuit further comprises a status generator for generating a status signal according to a voltage level of the ATIP signal when triggered by the wobble signal; when the ATIP signal changes the voltage level, the status signal changes its status according to the ATIP signal when triggered by the wobble signal.

11. The circuit of claim 10 wherein the synchronization circuit further comprises a period counter for counting a number of periods occurring within a period of the wobble signal according to the status signal so as to generate the ATIP clock.

* * * * *